Oct. 25, 1932.  D. K. WARNER  1,884,428
METHOD OF MAKING FROZEN BRINE
Filed Nov. 9, 1927
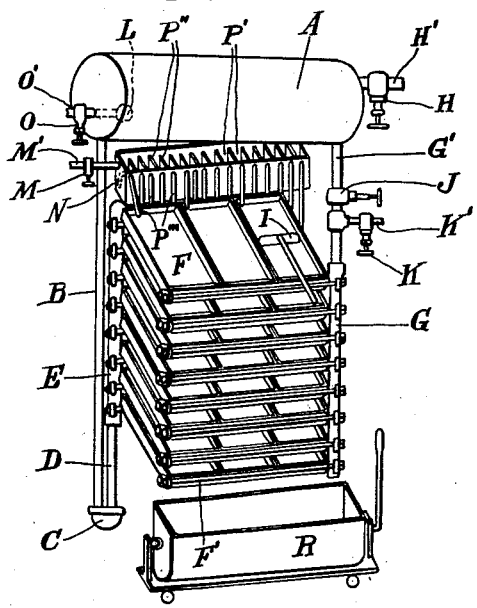
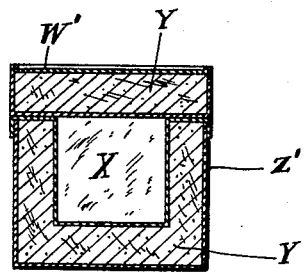
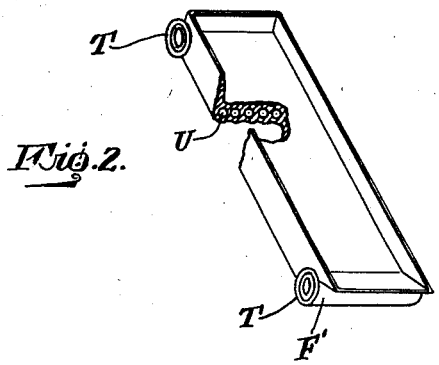
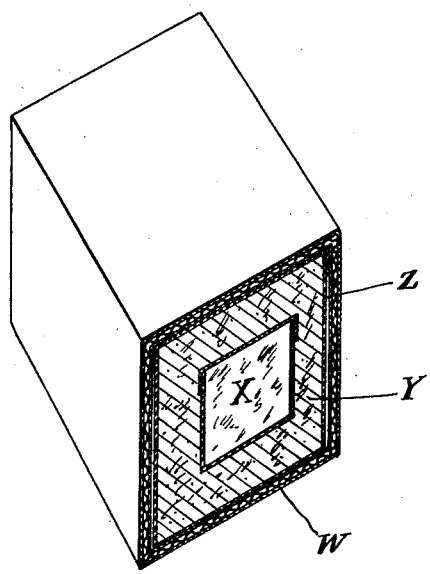
Inventor
Douglas K. Warner
By Geo. P. Kimmel
Attorney Patented Oct. 25, 1932

1,884,428

UNITED STATES PATENT OFFICE

DOUGLAS K. WARNER, OF BRISTOL, CONNECTICUT

METHOD OF MAKING FROZEN BRINE

Application filed November 9, 1927. Serial No. 232,083.

This invention relates to bulk frozen brine and a method for making the same, and has for its primary object to produce a bulk frozen brine in sheet, slab, or block form of uniform density throughout, whereby the temperature of the bulk frozen brine may be maintained at a constant, predetermined temperature until the brine is completely melted.

Bulk frozen brine, in accordance with this invention, is designed primarily for use in maintaining ice cream at exact and predetermined temperatures during the delivery of the ice cream in retail packages and in wholesale trucks.

At the present time there are three common methods of packing ice cream for delivery in retail packages. The first method consists of a pail with crushed ice and salt, which is more or less cumbersome and messy, and also produces a varying temperature, as the density of the salt solution caused by the melting ice is always changing.

A second method is to use an expensive, highly insulated package, depending on the high thermal content of the ice cream to prevent a too rapid rise in temperature. In this method the insulation of the package must be forty times as efficient as in a package in which one inch of frozen brine is placed around the ice cream, in order to preserve the ice cream for the same length of time. Even then the temperature of the ice cream will vary in the highly insulated package and the cost of such an insulated package is practically prohibitive.

A third method is to pack the ice cream with frozen carbondioxide or dry ice. This material freezes the ice cream so hard that much of its flavor is lost and the temperature of the ice cream must be permitted to rise before the same can be eaten.

In the usual manner of packing ice cream for wholesale delivery in trucks, three compartments are used for ice and salt. One of the compartments contains a mixture of ice and salt for keeping the ice cream cool en route. The other compartments respectively contain ice and salt separately for use in icing the cabinet at the point of delivery.

In the use of bulk frozen brine in accordance with this invention for packing ice cream in trucks for wholesale delivery, only one compartment for the bulk frozen brine is necessary. As the ice cream is delivered, a portion of the bulk frozen brine is removed from the compartment for packing the ice cream in the receiving cabinets therefor. In this manner, the bulk frozen brine is exhausted simultaneously with the completion of the delivery of the ice cream and there is no loss of refrigeration during the return of the truck. Furthermore, the uniform density of the bulk frozen brine maintains the ice cream at an exact, uniform, predetermined temperature during transit and after delivery.

In the use of bulk frozen brine in accodance with this invention for packing ice cream for retail delivery, the ice cream may be packed in a carton which may be manufactured at sufficiently small expense to warrant throwing the carton away after the ice cream has been removed therefrom. Furthermore, due to the uniform density of the bulk frozen brine, the ice cream will be maintained at an exact, predetermined temperature.

In the accompanying drawing:

Figure 1 is a perspective view of one form of apparatus for manufacturing bulk frozen brine in accordance with this invention.

Figure 2 is an enlarged, detailed, perspective view of one of the trays of said apparatus.

Figure 3 is a sectional perspective view of a package suitable for use in packing ice cream for retail delivery.

Figure 4 is a section of another form of package suitable for packing ice cream for retail delivery.

Referring now in detail to the drawing, with reference to Figures 1 and 2, the letter A designates a tank adapted to cont in a refrigerant, preferably ammonia, which is connected by means of a pipe O' with any suitable source of supply, not shown. The pipe O' is provided with a valve O, which is controlled by a float L located within the tank A to maintain the level of the liquid within the tank constant.

Disposed beneath the tank A is a plurality of trays F, arranged side by side in rows, and with the rows arranged in superposed relation. Each of the trays F is provided in the bottom thereof with a plurality of spaced, longitudinally extending cores U, the respective ends of which terminate in headers F', one of which is disposed at either end of the tray, transversely thereof. The headers F' are provided at their ends with flanged connections T in order that the headers F' of each row of trays F may be connected together.

Disposed vertically of the superposed trays F, at one rearward corner thereof, is a header E, which is connected with each of the headers F' located at the rearward ends of the trays F. Disposed vertically at the opposite forward corner of the superposed trays F is a similar header G which is connected with each of the headers F', located at the forward ends of the trays F. The ends of the headers F', opposite the vertical headers E and G, are provided with any suitable form of plug for closing said ends.

Connected with and depending from the header E is a pipe D, which is connected with a similar pipe B which extends upwardly above the trays F into communication with the tank A. The connection of the pipes D and B below the level of the trays F provide a trap C between the header E and tank A. Connected with the header G at the upper end thereof is a pipe G' which extends upwardly into communication with the tank A at the opposite end of the tank from the pipe B. Connected with the pipe G' is a hot gas pipe K', which is provided with a valve K. Between the hot gas pipe K' and the tank A, the pipe G' is provided with a valve J. A suction pipe H', provided with a suction valve H, leads from the tank A at the end opposite the pipe O. The entrance of the pipe H' into the tank A is disposed above the entrance of the pipe O into the tank and above the float L.

Disposed beneath the tank A and above the upper planes of the trays F is a brine tank P, which is connected by means of a pipe M', with any suitable source of supply, not shown. The pipe M' is provided with a valve M. The tank P is divided into a plurality of compartments P', the dividing walls P'' of which are disposed beneath the upper edges of the tank P. Leading from each of the compartments P' is a siphon tube P''', the inner ends of which are disposed adjacent the bottoms of the compartments P'. Each of the siphon tubes P''' leads to one of the trays F and has its outer end disposed in a plane below its inner end.

In the manufacture of bulk frozen brine in accordance with this invention, by means of the above described apparatus, the valve J is closed and ammonia or other suitable refrigerant is admitted to the tank A through the float controlled valve O. Owing to the disposition of the tank A above the trays F, the headers E and G and cores U of the trays F are completely flooded with refrigerant.

The valve M is then opened to admit a brine solution of predetermined density into the tank P. When the brine in the tank P reaches a higher level than the highest point of the siphon tubes P''', the brine starts running through the tubes P''' into the trays F and the valve M is then closed. Each of the trays F is filled from a separate compartment P' in the tank P and each of the trays F receives exactly the same amount of brine and of the same density. The comparatively hot brine in the trays F causes the refrigerant in the cores U to evaporate and pass in the form of gas into the header G and up through the pipe G' to the tank A from which the gas is withdrawn through the suction valve H. The trap C forming the connection between the pipes D and B prevent the gases formed in the cores U from passing to the pipe B. The direct expansion of the refrigerant within the cores U quickly freezes the brine within the trays F into thin sheets. Due to the rapidity with which the brine in the trays F is frozen, there is no separation of the salt in the brine solution and the brine frozen in the trays F is consequently of uniform density throughout. The strength of the solution may be varied to freeze at any temperature desired between the melting point of its cryohydrate and 32° F.

When the brine in the trays F is frozen, the valves J and H are closed and the valve K is opened to permit the hot gas to be forced through the pipe K' into the header G. As the hot gases are forced through the header G, cores U, and header E, the refrigerant within the headers G and E and cores U is forced through the pipes D and B to the tank A. The trap C prevents the hot gas from passing into the pipe B. The passage of the hot gas through the cores U loosens the frozen brine from the trays F, after which the sheets of frozen brine may be raked out by means of the hoe I into the dump cart R. The valve K is then closed and the valves J and H opened and the hot gases withdrawn through the suction pipe H' and the headers G and E and cores U are again flooded with refrigerant from the tank A.

Figures 3 and 4 in the drawing illustrates the use of bulk frozen brine for packing ice cream in retail packages. In Figure 3, the letter Z denotes a carton having a quantity of ice cream X disposed therein, around which is packed sheets of bulk frozen brine Y. The carton Z is disposed within a corrugated cover W.

In Figure 4 the carton Z' is formed with an open top and is provided with a cover W'. The ice cream X is placed within the carton Z' and sheets of brine Y are disposed there-around. The cover W' is a hollow member and is also adapted to contain sheets of brine Y.

It is to be understood that the form of the invention herewith shown and described is to be taken as the preferred example of the same and that various changes in the size, shape and arrangement of parts may be resorted to without departing from the spirit of the invention or the scope of the appended claims.

What I claim is:

1. A method of quick freezing a solution of lesser concentration than that of its cryohydrate to produce a frozen mass of crystals of substantially uniform density throughout consisting of supplying a shallow container with a body of the solution, and then absorbing the heat from such body while the latter is in a still condition within the container, into a refrigerant in contact with the container to cause in connection with the refrigerant the freezing of said body rapidly without the presence of convection currents or other motions whereby said body is frozen without noticeable separation of solids or concentration of part of the solution.

2. A method of quick freezing a solution of less concentration than that of its cryohydrate to produce a frozen mass of substantially uniform density throughout consisting in placing bodies of such solution in containers of shallow depth supporting a refrigerant of a very low temperature, and while said bodies are in still condition in the containers utilizing said containers in conjunction with the refrigerant to freeze said bodies rapidly without the presence of convection currents or other motions whereby the bodies are frozen without noticeable separation of solids or concentration of part of the solution.

3. A method of quick freezing a solution of less concentration than that of its cryohydrate to produce a frozen mass of substantially uniform density throughout consisting in supplying a refrigerant of a very low temperature to refrigerant receiving spaces of a plurality of superposed containers, supplying a body of the solution to a solution receiving space in each of the containers and above the refrigerant, and then absorbing the heat from each body while the latter is in a still condition in its receiving space by the refrigerant to cause the freezing of said bodies rapidly without the presence of convection currents, or other motions whereby said bodies are frozen without noticeable separation of solids or concentration of part of the solution.

4. A method of quick freezing solution of less concentration than that of its cryohydrate to produce a frozen mass of substantially uniform density throughout consisting in supplying a container a predetermined quantity of the solution, and then absorbing the heat from the body of the solution in an adjacent refrigerant, while such body is in a still condition within the container, by directly vaporizing refrigerant in contact with the container to cause in connection with the refrigerant the freezing of the solution in the container rapidly upwardly without the presence of convection currents or other motions whereby the solution in the container is frozen without noticeable separation of solids therein or concentration of parts thereof by gravity or motion.

In testimony whereof, I affix my signature hereto.

DOUGLAS K. WARNER.